US009710651B2

(12) United States Patent
Stewart et al.

(10) Patent No.: US 9,710,651 B2
(45) Date of Patent: Jul. 18, 2017

(54) SECURE PROCESSOR FOR SOC INITIALIZATION

(71) Applicant: ViXS Systems Inc., Toronto (CA)

(72) Inventors: Norman Stewart, Toronto (CA); Jing Zhang, Richmond Hill (CA); Heyun Zheng, Toronto (CA)

(73) Assignee: VIXS SYSTEMS INC., Toronto (CA)

( * ) Notice: Subject to any disclaimer, the term of this patent is extended or adjusted under 35 U.S.C. 154(b) by 54 days.

(21) Appl. No.: 14/683,288

(22) Filed: Apr. 10, 2015

(65) Prior Publication Data
US 2016/0300064 A1 Oct. 13, 2016

(51) Int. Cl.
| G06F 9/24 | (2006.01) |
| G06F 15/177 | (2006.01) |
| G06F 21/57 | (2013.01) |
| G06F 12/14 | (2006.01) |
| G06F 21/44 | (2013.01) |
| G06F 3/06 | (2006.01) |
| G06F 12/06 | (2006.01) |
| G06F 9/44 | (2006.01) |
| H04L 9/08 | (2006.01) |
| H04L 9/32 | (2006.01) |
| G06F 21/72 | (2013.01) |
| G06F 21/34 | (2013.01) |

(52) U.S. Cl.
CPC ......... G06F 21/575 (2013.01); G06F 3/065 (2013.01); G06F 3/0619 (2013.01); G06F 3/0665 (2013.01); G06F 3/0679 (2013.01); G06F 9/4411 (2013.01); G06F 12/0638 (2013.01); G06F 12/1408 (2013.01); G06F 21/44 (2013.01); G06F 21/34 (2013.01); G06F 21/72 (2013.01); *G06F 2212/1052* (2013.01); *G06F 2212/205* (2013.01); *H04L 9/0863* (2013.01); *H04L 9/32* (2013.01)

(58) Field of Classification Search
CPC ...... G06F 21/575; G06F 21/572; G06F 21/72; G06F 21/34; H04L 9/0863; H04L 9/32; H04L 9/3228
USPC .................................. 713/1, 2, 100
See application file for complete search history.

(56) References Cited

U.S. PATENT DOCUMENTS

2012/0198224 A1* 8/2012 Leclercq ............... H04L 9/083
                                      713/2
2015/0199520 A1* 7/2015 Woolley ............... G06F 21/575
                                      713/2

* cited by examiner

Primary Examiner — Michael J Brown

(57) ABSTRACT

An embedded system includes an interface to an external peripheral device storing secure boot code and a secure boot controller. The secure boot controller includes a secure central processing unit (CPU) having a processor core, a random access memory (RAM) coupled to the processor core, and a read only memory (ROM) coupled to the processor core. The ROM stores initialization firmware configured to manipulate the processor core to initiate transfer of a copy of the secure boot code from the external peripheral device to the RAM and to authenticate the secure boot code. The processor core further is to execute the secure boot code from the RAM to initialize the embedded system. After initialization of the embedded system is completed, the secure CPU can be repurposed to execute application code that has been stored to the RAM after initialization, the application code representing an independent software function.

17 Claims, 5 Drawing Sheets

SECURE PROCESSOR FOR SOC INITIALIZATION

FIELD OF THE DISCLOSURE

The present disclosure generally relates to embedded devices and more particularly to boot-up/initialization of embedded devices.

BACKGROUND

Embedded systems often use various protection mechanisms to protect the data being processed by the embedded system from unauthorized access. To illustrate, multimedia embedded systems often utilize authentication, encryption, and watermarking to prevent unauthorized access to the multimedia data being processed. Unauthorized entities frequently attempt to gain access to the data by attacking the underpinning operation of the embedded system. Oftentimes, an embedded system is particularly vulnerable to such attacks during its initialization phase (also known as "boot up"), and thus an attacker may attempt to hijack operation of the embedded system during the initialization phase, either by introducing fraudulent boot code so that the embedded system boots in a manner that provides unimpeded access to the multimedia data, or by disabling access mechanisms that otherwise prevent access to memory associated with the embedded system, and thus enabling the attacker to access the multimedia data via the memory or to access the code implementing one or more of the protection mechanisms.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
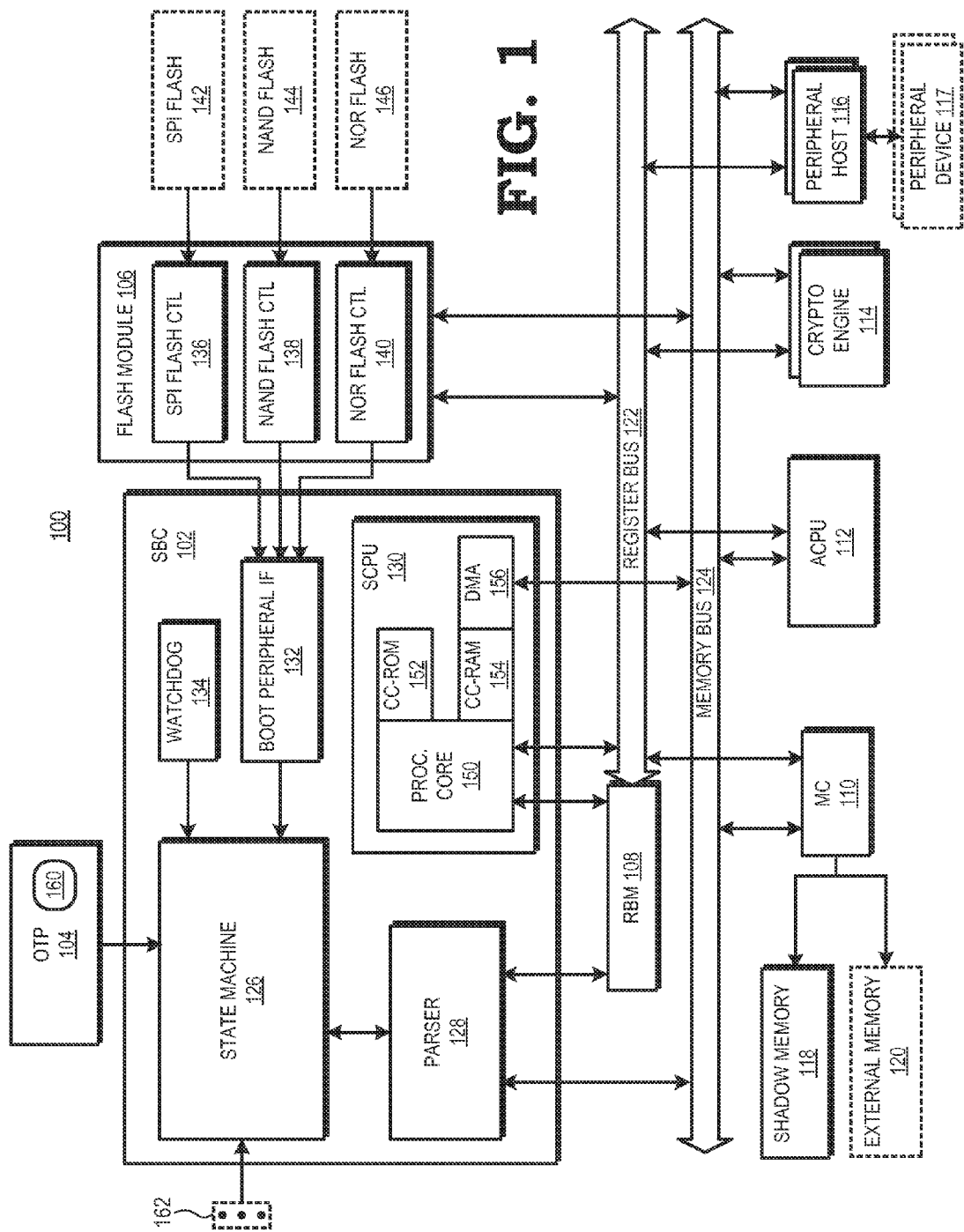
FIG. 1 is a block diagram illustrating an embedded system utilizing a secure boot controller in accordance with at least one embodiment of the present disclosure.

FIGS. 1-6 illustrate example techniques for secure initialization of an embedded system. In at least one embodiment, the embedded system incorporates a secure boot controller (SBC) that provides self-boot functionality for initializing the embedded system separate from the host system incorporating the embedded system. The SBC can provide for two self-boot modes: a secure self-boot mode and a non-secure self-boot mode. In the non-secure self-boot mode, a copy of non-authenticated boot code is accessed from an external location as identified by bootstrap configuration information conveyed by bootstrap pins or provisioning information stored in a one time programmable (OTP) memory of the embedded system. The accessed non-authenticated boot code is then executed by the SBC to initialize, or boot, the embedded system.

In the secure self-boot mode, the SBC holds the embedded system in a tamper-proof state and makes use of a secure CPU that has a processor core and a read only memory (ROM) and random access memory (RAM), each of which is dedicated to the processor core and thus accessibly only via the processor core during the boot process. The ROM stores initialization firmware that is executed by the processor core during a first phase of the secure self-boot mode to interpret provisioning information stored in a one time programmable (OTP) memory of the embedded system to identify a location of secure boot code at a non-volatile memory or other external peripheral device, initiate transfer of a copy of the secure boot code from to the RAM, and to authenticate the secure boot code. In the following second phase of the secure self-boot mode (and assuming successful authentication of the secure boot code), the processor core shifts to executing the secure boot code to initialize the embedded system in conjunction with the provisioning information stored in the OTP memory. As such, in the secure self-boot mode, initialization of the embedded system has two phases: execution of firmware code from the ROM to set up secure boot code in the RAM, followed by execution of the secure boot code from the RAM.

After the execution trace of the secure CPU switches from the ROM to the RAM during the boot process, in at least one embodiment the SBC configures the ROM to prevent further access to the ROM by the secure CPU or any other component, thereby protecting the ROM from unauthorized access via a ROM dump or a playback attack. Further, because the secure CPU would be otherwise idle after initialization, in some embodiments the SBC provides for a "rebirth" mode whereby the secure CPU can be repurposed to execute application code that has been stored to the RAM, the application code representing an independent functional module that supports overall operation of the embedded system.

For ease of illustration, the techniques of the present disclosure are described in the example context of an embedded system in the form of a system-on-a-chip (SoC) for use in multimedia processing. However, these techniques may be employed in other forms of embedded systems, or for other data processing contexts, using the guidelines provided herein. Further, although example embodiments implementing non-volatile memory in the form of Flash memory are described for ease of convenience, the present disclosure is not limited to these embodiments, but instead may incorporate any of a variety of types of non-volatile memory.

FIG. 1 illustrates an example embedded system 100 implementing a secure boot process in accordance with at least one embodiment of the present disclosure. The embedded system 100, in at least one embodiment, is implemented as a SoC and thus also is referred to herein as SoC 100 for ease of reference. The SoC 100 may be implemented in any of a variety of data processing systems. For ease of illustration, the SoC 100 is described herein in the example context of a part of a multimedia processing system used to encoded, decode, transcode, display, or otherwise process multimedia data, such as a set-top box, digital television, digital cable tuner, tablet, smartphone, game console, and the like.

The hardware components of the SoC 100 include a secure boot controller (SBC) 102, a one-time programmable (OTP) memory 104, a Flash module 106, a register bus manager (RBM) 108, a memory controller 110, one or more application processors 112 (referred to herein as application central processing unit 112 or "ACPU" 112), one or more cryptographic engines 114, and one or more other peripheral hosts 116 to couple to "external" (that is, outside of the SoC 100) peripheral devices, such as a Peripheral Component Interconnect Express (PCIe) interface or a Universal Asynchronous Receiver/Transmitter (UART) interface to couple to an external hard drive, a video card, a network interface, and the like. The memory controller 110 is connected to an "on-chip" (that is, within the SoC 100) shadow memory 118 and may be connected to an external or off-chip system memory 120. In at least one embodiment, the shadow memory 118 is an aliased segment of the external memory 120, and thus is transparently accessible to on-chip clients. Further, because the shadow memory 118 is on die, it requires less power, provides for reliable and secure operation during boot or low power states, and is extremely difficult to tamper with during device low-power states. The SoC 100 further includes a register bus 122 and a memory bus 124 to interconnect the various components, as shown in FIG. 1.

In operation, the SoC 100 operates to process multimedia data in accordance with one or more operating systems or software applications executed by the ACPU 112. To this end, the software application code to be executed by the application processor 112 may be loaded by the memory controller 110 into the external memory 120 from an external peripheral device via one or more of the peripheral hosts 116, where the peripheral device may include, for example, a hard drive, an optical drive, a wireless or wired network interface coupled to a remote network source, or a non-volatile memory device, such as a Flash memory, associated with the SoC 100. The multimedia data to be processed by the ACPU 112 likewise may be loaded by the memory controller 110 into one or both of the shadow memory 118 or the external memory 120 from one or more peripheral devices via a corresponding peripheral host 116. The ACPU 112 thus may comprise one or more of a central processing unit (CPU), a graphics processing unit (GPU), a microcontroller, a digital signal processor, a field programmable gate array, programmable logic device, state machine, logic circuitry, analog circuitry, digital circuitry, or any device that manipulates signals (analog and/or digital) based on operational instructions that are stored in the memories 118, 120 or other non-transitory computer readable storage medium.

The processing of the multimedia data performed by the ACPU 112 can include, for example, one or more of encrypting multimedia data, decrypting multimedia data, encoding multimedia data, decoding multimedia data, transcoding multimedia data, and formatting multimedia data for display. To illustrate, the SoC 100 may be a component of a digital television, and thus the ACPU 112 may execute one or more software applications that operate to decode received digital television content and process the resulting decoded content for display on a screen of the digital television. As part of the multimedia processing, the ACPU 112 may interact with one or more cryptographic engines 114 so as to authenticate received multimedia data, decrypt encrypted multimedia data, or encrypt unencrypted multimedia data. The cryptographic engine 114 may implement any of a variety or combinations of cryptographic algorithms, such as an RSA-based, DES-based, or AES-based cryptographic algorithm.

Multimedia data often is protected to prevent copyright violations or other unauthorized access to the multimedia data. As such, an unauthorized entity seeking to gain access to the multimedia data may attempt to hack the SoC 100 so as to circumvent the protection mechanisms employed by the SoC 100. As the SoC 100 is particularly vulnerable to attack during initialization, in at least one embodiment the SoC 100 employs the SBC 102 to more fully secure the SoC 100 during the boot up/initialization process. As illustrated in FIG. 1, the SBC 102 includes a state machine 126, a parser 128, a secure central processing unit (CPU) 130 (also referred to herein as "SCPU" 130), a boot peripheral interface 132, and a watchdog timer 134. The state machine 126 coordinates the overall booting procedure employed by the SBC 102. The watchdog timer 134 provides a timer function to restrict the critical booting time span.

To provide implementation flexibility, the Flash module 106 may employ multiple types of Flash controllers to permit the SoC to connect to any of a variety or combination of types of external Flash memories. Such Flash controllers can include, for example, a Serial Peripheral Interface (SPI) Flash controller 136, a NAND Flash controller 138, and a NOR Flash controller 140 in the event that the SoC 100 is connected to a SPI Flash memory 142, a NAND Flash memory 144, or a NOR Flash memory 146, respectively. In a non-secure self-boot mode, the boot peripheral interface 132 interfaces with the appropriate Flash controller of the Flash module 106 to load boot code from the external Flash memory connected to the SoC 100 and the parser 128 operates to execute this boot code in the non-secure self-boot mode. The watchdog timer 134 provides a timer function to restrict the critical booting time span.

The SCPU 130 operates to authenticate and execute secure boot code in a secure self-boot mode. In the depicted example, the SCPU 130 includes one or more CPU cores 150 or other types of processor cores, a read only memory (ROM) 152, and a random access memory (RAM) 154. In at least one embodiment, the ROM 152 and the RAM 154 are dedicated to the CPU core 150 and thus are accessible only via the SCPU 130. In reference to this configuration, the ROM 152 and RAM 154 are referred to herein as closely-coupled ROM ("CC-ROM") 152 and closely-coupled RAM ("CC-RAM") 154, respectively. The CC-ROM 152 is used to store initialization firmware that is executed by the SCPU 130 during an initial phase of a secure self-boot operation in order to interpret the OTP provisioning information 160 in the OTP memory 104 and to process the decryption and authentication of secure binary boot code, as well as the storage of the secure binary boot code into the CC-RAM 154 during the secure self-boot operation. To support this transfer, the SCPU 130 further includes a write-only direct memory access (DMA) engine 156 configured to transfer data into the CC-RAM 154 from main memory (e.g., memories 118, 120).

The OTP memory 104 stores various information used by the SoC 100, including provisioning information 160 utilized by the SBC 102 to provision the various components of the SOC 100 during the boot up process. The provisioning information 160 may include, for example, an identifier of the storage device or peripheral containing the boot code, an offset (address) and size of the boot code, any hardware and software entitlements for SoC (i.e. permanent or soft enable/disable of features), an indication of a selection of conditional access mechanisms and boot process (multiple boot methods may be supported in ROM, selected by OTP), on-chip keys for decryption and authentication of boot code from peripheral, on-chip keys for derivation of key ladders for code or content, and the like. This provisioning information 160 further may include configuration information indicating which boot mode is to be implemented by the SBC 102, the location of the boot code to be accessed and executed by the SCPU 130 or the parser 128 (depending on self-boot mode), and the like. Alternatively, as detailed below, the particular boot mode to be implemented by the SBC 102 and the location of the boot code to be accessed may be indicated via a configuration of bootstrap pins 162. Further, the OTP memory 104 may store information used by the cryptographic engines 114, such as cryptographic keys and the rules for their access and use or authentication parameters for use in authenticating the secure boot code accessed for the secure self-boot mode.

Figure 2:
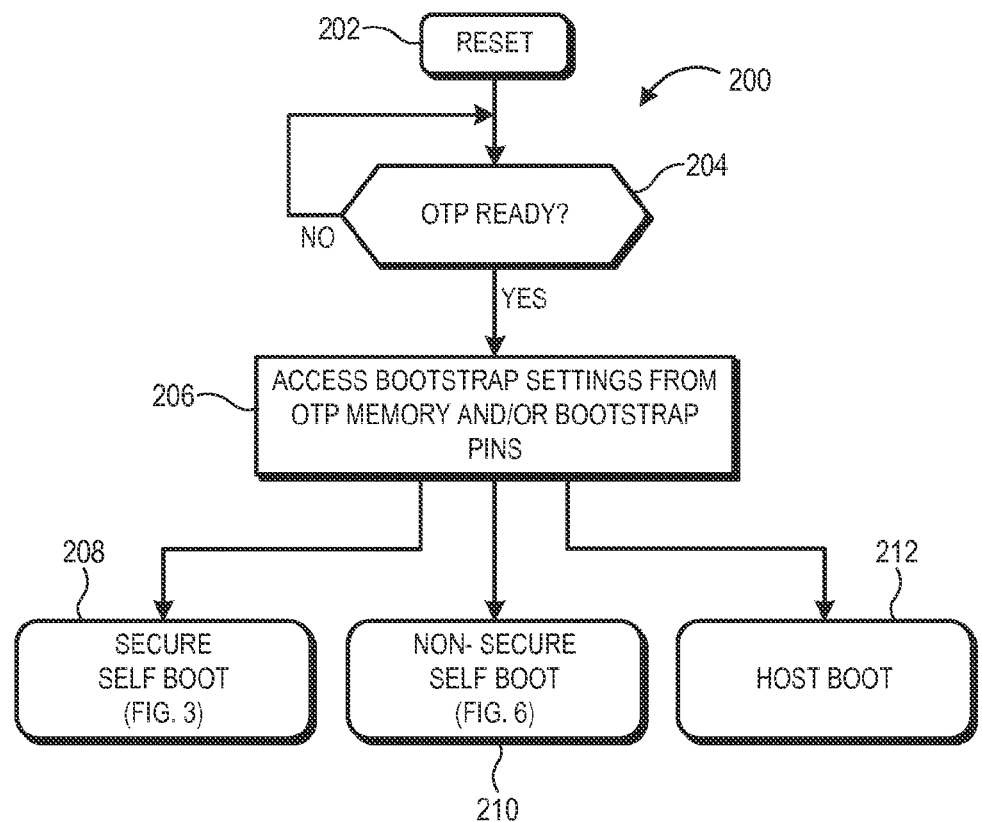
FIG. 2 is a block diagram illustrating a method for boot mode selection for the secure boot controller of FIG. 1 in accordance with at least one embodiment of the present disclosure.

FIG. 2 illustrates an example method 200 of operation of the SBC 102 to control the boot process for the SoC 100 in accordance with at least one embodiment. The method 200 initiates at block 202 with the deassertion of system reset for the host system implementing the SoC 100 (referred to herein as a "cold boot") or with the return of the SoC 100 from a suspended state (referred to herein as a "warm boot"), such as in response to detection of a Suspend-to-Ram (STR) wakeup event that returns the SoC 100 from a STR idle state. Following the reset, the SBC 102 assumes control of the SoC 100. At this point, all of the host interfaces (e.g., peripheral host 116) are disabled. As the OTP memory 104 stores the provisioning information 160 used by the SBC 102 to initialize the components of the SoC 100 during the boot process, at block 204 the SBC 102 waits for the OTP memory 104 to initialize following the system reset at block 202.

When the OTP memory 104 is ready, at block 206 the SBC 102 evaluates the provisioning information 160 accessed from the OTP memory 104 and the state(s) indicated by the bootstrap pins 162 to determine the particular boot mode to be implemented by the SBC 102. In at least one embodiment, the SBC 102 supports three boot modes: a secure self-boot mode 208; a non-secure self-boot mode 210; and a host boot mode 212. As described in greater detail with reference to FIGS. 3-5 below, in the secure self-boot mode 208 the SCPU 130 accesses binary boot code from Flash memory (or other non-volatile memory) or other external peripheral device via one of the peripheral hosts 116, authenticates and/or decrypts the boot code, stores the authenticated/decrypted boot code in the CC-RAM 154, and then executes the boot code from the CC-RAM 154 to boot the SoC 100 in accordance with the provisioning information 160 stored in the OTP memory 104. As described in greater detail with reference to FIG. 6 below, in the non-secure self-boot mode 210, boot code is accessed from Flash memory or other external peripheral device and executed without authentication or secure storage by the parser 128 to boot the SoC 100 in accordance with the provisioning information 160 in the OTP memory 104. In the host boot mode 212, an external host CPU (not shown) of the multimedia system initializes the SoC 100 via a PCIe interface (one example of the peripheral host 116), an I²C interface (another example of the peripheral host 116), or the like, using any of a variety of established host boot techniques.

Figure 3:
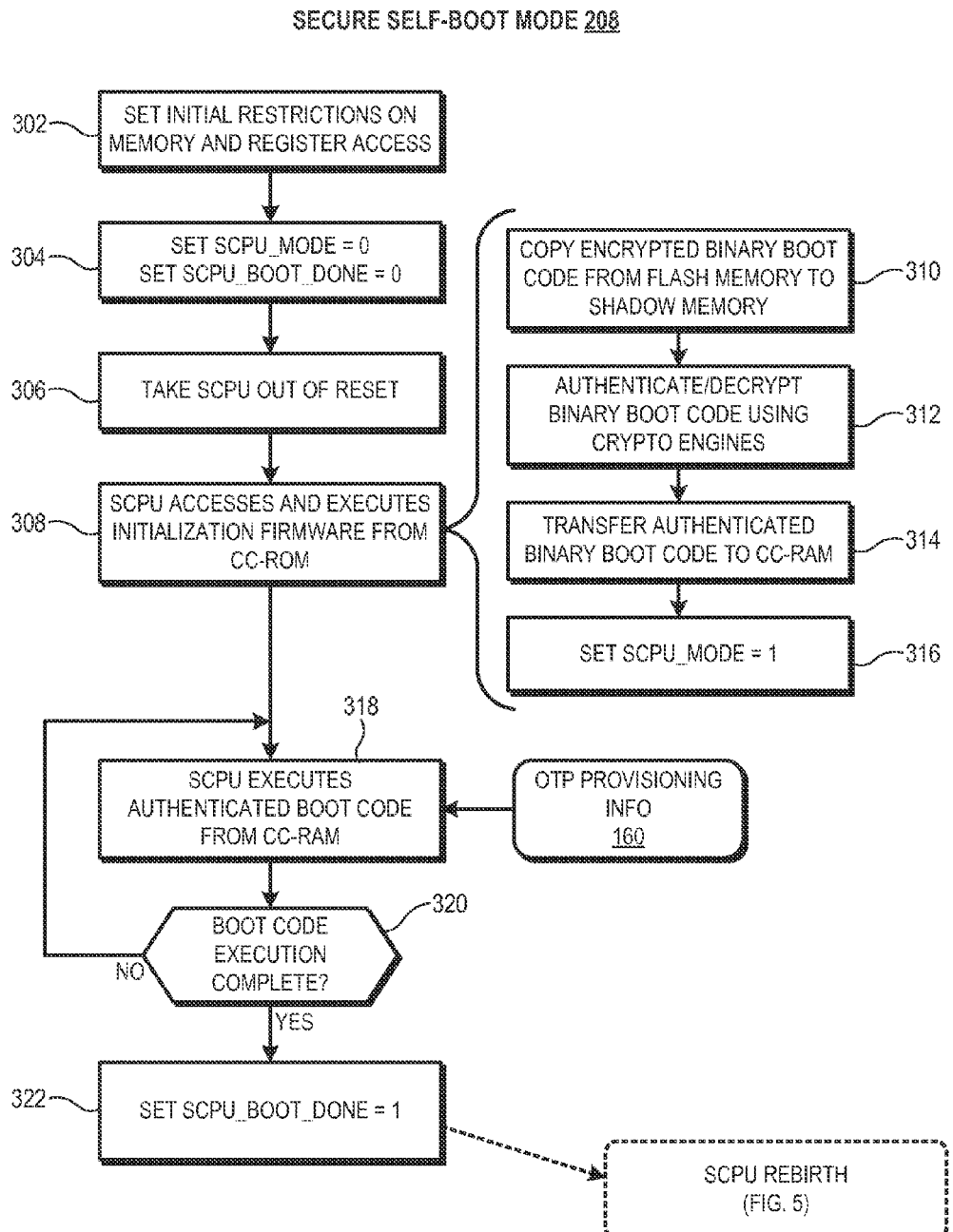
FIG. 3 is a block diagram illustrating a method for a secure self-boot mode of the secure boot controller of FIG. 1 in accordance with at least one embodiment of the present disclosure.

FIG. 3 illustrates an example operation of the secure self-boot mode 208 implemented by the SBC 102 in accordance with at least one embodiment of the present disclosure. The boot process while in the secure self-boot mode 208 initiates at block 302, whereupon the state machine 126 sets initial restrictions on memory access and register access. In at least one embodiment, this includes the state machine 126 signaling the RBM 108 and memory controller 110 to block access to the register subsystem (not depicted in FIG. 1) and the memory subsystem by all initiators, with the exception of the SCPU 130 or any debug interfaces (not depicted in FIG. 1). As such, any attempted accesses to the busses 122, 124 will result in a silent failure, such as by the return of NULL values in response to read access requests or the discarding of write access requests.

At block 304 the state machine 126 sets two status indicators used during the secure self-boot operation: SCPU_MODE and SCPU_BOOT_DONE. The SCPU_MODE status indicator is used to indicate whether the SCPU 130 currently is in the process of executing the initialization firmware stored in the CC-ROM 152 (SCPU_MODE=0) or has completed execution of the initialization firmware (SCPU_MODE=1), and thus at block 304 the state machine 126 sets SCPU_MODE=0 (or deasserted) to indicate that firmware execution has not completed. The SCPU_BOOT_DONE status indicator is used to indicate whether the SCPU 130 is in the process of performing the secure self-boot process (SCPU_BOOT_DONE=0) or has completed the secure self-boot process (SCPU_BOOT_DONE=1)(that is, has completed execution of both the initialization firmware stored in the CC-ROM 152 and authenticated secure boot code stored in the CC-RAM 154). Thus, at block 304 the state machine 126 sets SCPU_BOOT_DONE=0 (or deasserted) to indicate that the secure self-boot process has not completed.

When the system reset is deasserted at block 202 (FIG. 2) or the multimedia processing system is woken from a STR idle state, the state machine 126 initially maintains the SCPU 130 in a reset state to prevent premature execution of the initialization firmware in the CC-ROM 152. However, with the determination that the SBC 102 is to enter the secure self-boot mode 208 and the resulting initialization performed at blocks 302 and 304, the state machine 126 is ready for the SCPU 130 to begin execution. Accordingly, at block 306 the state machine 126 releases the SCPU 130 from reset. In response, at block 308 the SCPU 130 accesses the CC-ROM 152 and executes the initialization firmware stored therein.

The initialization firmware in the CC-ROM 152 primarily serves to prepare the SCPU 130 for execution of secure binary boot code that is used to boot the SoC 100 based on the OTP provisioning information 160. Accordingly, as illustrated by block 310, execution of the initialization firmware manipulates the SCPU 130 to identify, through interpretation of the OTP provisioning information 160, the Flash memory storing the secure binary boot code and manipulates the SCPU 130 to control the corresponding Flash controller of the Flash module 106 to begin transfer of the secure binary boot code from the identified Flash memory to the shadow memory 118. For example, during provisioning of the multimedia system implementing the SoC 100, the SoC 100 may be connected to a NAND Flash memory 144 that stores the secure binary boot code and the OTP memory 104 may be programmed with OTP provisioning information 160 that identifies the NAND Flash memory 144 as the source of the secure binary boot code and identifies the start location of the secure boot code within the NAND Flash memory 144. In this case, the initialization firmware would manipulate the SCPU 130 to identify the NAND Flash memory 144 as the source of the secure boot code based on the OTP provisioning information, and thus trigger the SCPU 130 to interface with the NAND Flash controller 138 to initiate copying of the secure boot code from the indicated location in the NAND Flash memory 144 to the shadow memory 118.

In other embodiments, the secure boot code may be stored in another external storage location, such as at a hard drive connected to the SoC 100 via a peripheral host 116 or at a remote server connected to the SoC 100 via a network interface card connected to the SoC 100 via a peripheral host 116. In such instances, the OTP provisioning information 160 identifies this external storage location, which is interpreted by the initialization firmware so as to control the SCPU 130 to initiate transfer of the secure binary boot code from the indicated external storage location to the shadow memory 118 in a similar manner.

As access to, or modification of, secure binary boot code in the Flash memory or other external storage location can leave the SoC 100 open to exploitation by an unauthorized entity, security measures are employed to prevent unauthorized access to the secure binary boot code and to prevent execution of modified secure binary boot code. Accordingly, at block 312 the initialization firmware manipulates the SCPU 130 to perform various security measures to verify the integrity of the secure binary boot code. One such measure is the performance of an authentication process by the SCPU 130 (alone or in conjunction with one or more of the cryptographic engines 114) to authenticate the secure binary boot code. To illustrate, the SCPU 130 may compute a hash of the boot code using, for example, SHA256 or similar while the boot code resides in secure memory, and compare this against a reference hash or PKCS signing certificate. A successful comparison enables execution of decrypted and authenticated code. Failure results in failsafe mechanism, as described herein. The secure binary boot code typically is encrypted to prevent unauthorized access, and thus at block 312 the initialization firmware also manipulates the SCPU 130 to coordinate with one or more of the cryptographic engines 114 to decrypt the encrypted secure binary boot code. As part of the authentication/decryption processes, the initialization firmware may utilize various authentication parameters or decryption parameters indicated by the OTP provisioning information 160, such as an indicator of the cryptography algorithm and/or cryptographic key to be used in decrypting the secure binary boot code, authentication parameters to be used in authenticating the secure binary boot code, and the like.

At block 314, the initialization firmware manipulates the SCPU 130 to store the decrypted and authenticated secure binary boot code to the CC-RAM 154. As the CC-RAM 154 is accessibly only via the SCPU 130, the SCPU 130 stores the secure binary boot code to the CC-RAM 154 as it is decrypted, thereby preventing unencrypted secure binary boot code from being present in the shadow memory 118. When the SCPU 130 has completed storage of the secure boot code to the CC-RAM 154, the initialization firmware manipulates the SCPU 130 to fill the remaining unused locations of the CC-RAM 154 with NOP values. At this point, the SBC 102 is ready to enter the second phase of the secure self-boot mode 208 in which the SCPU 130 switches from executing the initialization firmware from the CC-ROM 152 to executing the secure boot code from the CC-RAM 154 to complete the boot process for the SoC 100. Accordingly, at block 316 the state machine 126 sets SCPU_MODE=1 (or asserted) to signal this transition.

In response to the assertion of the SCPU_MODE indicator, at block 318 the SCPU 130 transitions from execution of the initialization firmware in the CC-ROM 152 to execution of the authenticated secure boot code in the CC-RAM 154. In at least one embodiment, the remaining locations of the CC-ROM 152 that are not used for storing the initialization firmware are filled with NOP values, and thus upon reaching the end of the initialization firmware the execution trace of the SCPU 130 will slide though all of the NOP values in the CC-ROM range and thus step into the CC-RAM 154, thereby implementing the transition.

The secure boot code is configured to complete the boot process for the SoC 100 based on the component configurations indicated by the OTP provisioning information 160. To illustrate, during this process the SBC 102 may hold the device in secure (tamper proof) state, and the SCPU 130 enumerates OTP flags/configurations for validity and proceeds with boot process for valid configurations. The SCPU 130 then may set sticky/permanent bits and may configure hardware features such as Trusted Execution Environment (TEE) protection mechanisms. The SCPU 130 then may enable hardware features and security related functions or countermeasures.

In some embodiments, the second boot phase represented by execution of the secure boot code from the CC-RAM 154 may implement different functions depending on whether the reset detected at block 202 (FIG. 2) signals a cold boot (that is, a system reset) or a warm boot (that is, a return from a STR state or other idle state). To illustrate, because the STR operation involves storage of SoC state to the external memory 120 so that the SoC can be placed in a low-power state, the stored SoC state is vulnerable to modification. As such, when the SoC state is stored to the external memory 120 during the STR initiation process, hash values are calculated for each segment of state data stored to the external memory 120. Thus, when the reset that triggered the secure self-boot process is a warm boot, the secure binary boot code may include functions that manipulate the SCPU 130 to recalculate the hash values (e.g., keyed-SHA256 values) for the protected segments of the external memory 120 and compare the recalculated hash values with the original values to verify that no modifications have been made to the stored SoC state while in the STR state.

When the SCPU 130 has completed execution of the secure binary boot code (as indicated by monitoring block 320), the SCPU 130 signals completion of the secure self-boot process at block 322 by setting SCPU_BOOT_DONE=1. For example, the last instruction of the secure binary boot code can be configured to manipulate the SCPU 130 to assert the SCPU_BOOT_DONE status indicator, or the state machine 126 may monitor the progress of the SCPU 130 and set the SCPU_BOOT_DONE status indicator when it has identified completion of execution of the secure binary boot code. Assertion to the SCPU_BOOT_DONE status indicator signals to the SBC 102 that the boot process has completed. Accordingly, the SBC 102 removes the access restrictions on the busses 122, 124, thereby permitting the ACPU 112 to execute an operating system and/or application software in support of the multimedia processing functions performed by the multimedia system implementing the SoC 100. Further, while SCPU_BOOT_DONE is asserted, the DMA engine 156 can only be controlled by the SCPU 130 to copy data from the memories 118, 120 to the CC-RAM 154. However, once SCPU_BOOT_DONE is deasserted, the DMA engine 156 is configured to permit its control by any RBM host, and thus the DMA engine 156 can be used in support of a SCPU rebirth mode, as described below with reference to FIG. 5.

Figure 4:
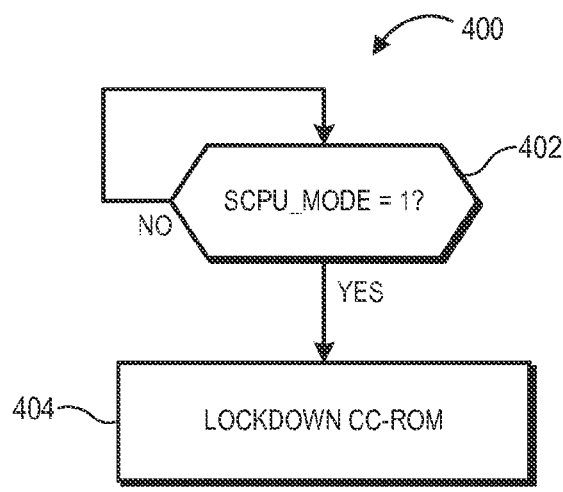
FIG. 4 is a block diagram illustrating a method for locking down a closely-coupled read only memory (ROM) of the secure boot controller of FIG. 1 in accordance with at least one embodiment of the present disclosure.

As the CC-ROM 152 stores the initialization firmware used for the initial phase of the secure self-boot process, the SoC 100 could be vulnerable to intrusion via the CC-ROM 152 via a ROM dump or a firmware playback attack. FIG. 4 illustrates an example method 400 implemented by the SBC 102 to protect against such types of attacks using the CC-ROM 152 by locking down the CC-ROM 152 from access in various situations. As depicted by block 402, the state machine 126 monitors the state of the SCPU_MODE status indicator. As noted above with respect to block 316, SCPU_MODE is asserted when the SCPU 130 completes execution of the initialization firmware in the CC-ROM 152 and has transitioned to executing code out of the CC-RAM 154. Further, in some embodiments, the watchdog timer 134 (FIG. 1) asserts SCPU_MODE when the specified guard interval has lapsed, thereby indicating either an error in the boot process or a possible unauthorized intrusion in the boot process. Either event indicates that no further access to the CC-ROM 152 is needed or should be permitted, and thus in response to detecting that the SCPU_MODE status indicator has been asserted, at block 404 the state machine 126 locks down the CC-ROM 152 so as to prevent any further access to the CC-ROM 152 until the next system reset. To lock down the CC-ROM 152, the state machine 126 may signal an interface of the CC-ROM 152 to implement address masking or address aliasing, signal the interface of the CC-ROM 152 to implement a NOP slide for any attempted accesses while in lock down, signal an error, or mask or discard the data for reads or writes, respectively.

Figure 5:
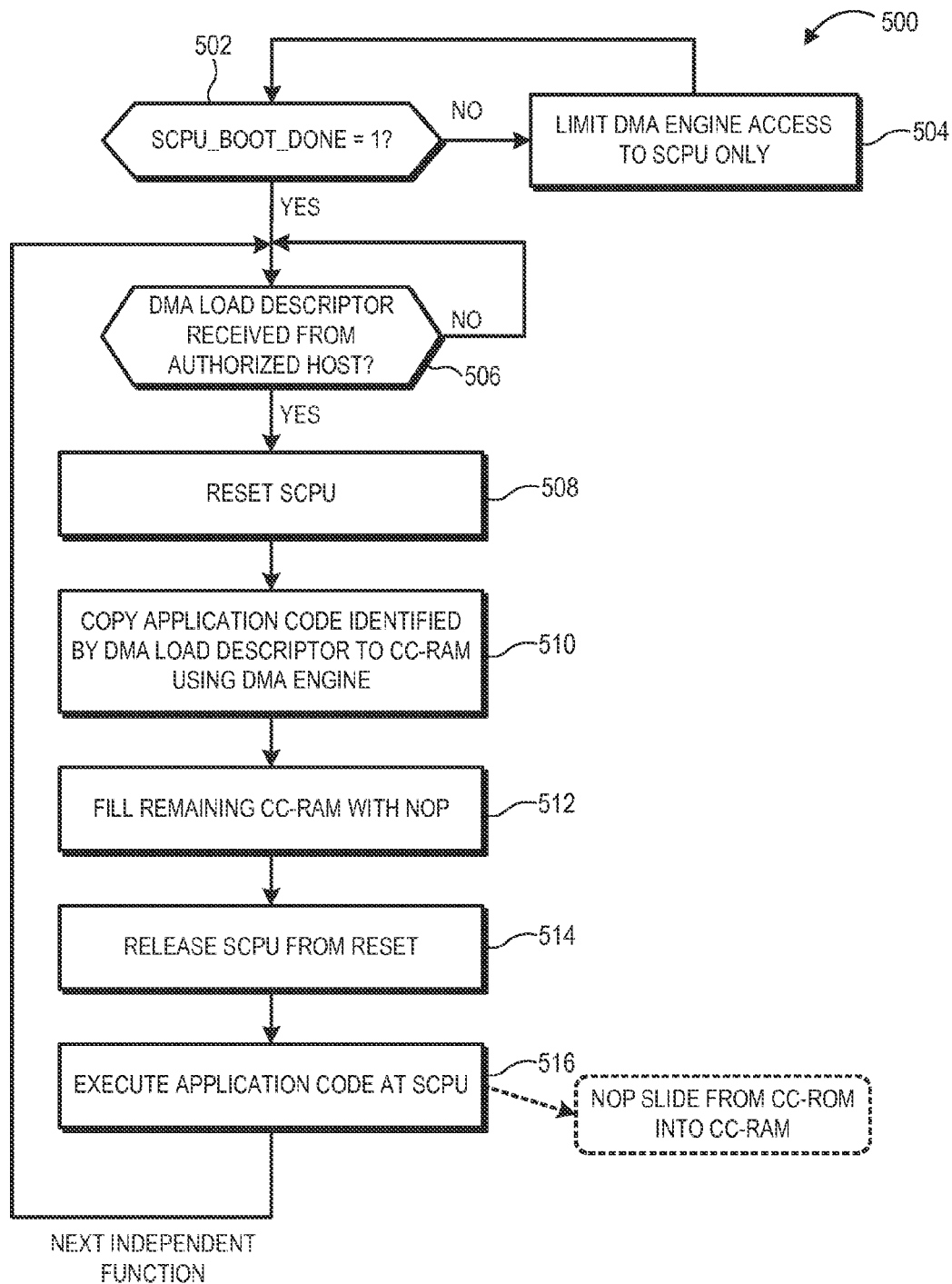
FIG. 5 is a block diagram illustrating a secure CPU rebirth process in accordance with at least one embodiment of the present disclosure.

As described above, the SBC 102 uses the SCPU 130 and the CC-RAM 154 to implement a secure boot process. However, rather than let the SCPU 130 and CC-RAM 154 go idle and unused after the boot process has completed, in at least one embodiment the SBC 102 implements a "rebirth" mode whereby the SCPU 130 can be repurposed after completion of the boot process to execute various stand-alone software functions or applications in support of the ACPU 112 or the SoC 100 at large. FIG. 5 illustrates an example method 500 for implementing this rebirth mode in accordance with at least one embodiment of the present disclosure. The method 500 initiates at block 502 with the state machine 126 monitoring the SCPU_BOOT_DONE status indicator to determine whether it has been asserted. As represented by block 504, while SCPU_BOOT_DONE is unasserted (=0), the state machine 126 maintains the configuration of the DMA engine 156 so as to prevent the DMA engine 156 from being controlled by any requestor other than the SCPU 130.

As noted above, the SCPU_BOOT_DONE status indicator is asserted when the SCPU 130 has completed execution of the secure binary boot code from the CC-RAM 154, and thus signaling that the SCPU 130 has become available for repurposing. Accordingly, in response to detecting an assertion of the SCPU_BOOT_DONE status indicator, the state machine 126 reconfigures the DMA engine 156 to permit control of the DMA engine 156 by any RBM host (e.g., a peripheral device connected to the register bus 122 via a peripheral host 116).

When a peripheral device or other RBM host seeks to use the SCPU 130 to execute an independent functional module during the SCPU rebirth mode, the RBM host supplies to the DMA engine 156 a DMA load descriptor that specifies the start location of a corresponding block of application code representing the functional module. For example, as described above, a warm boot may require the recalculation of hash values for segments of the external memory 120 storing the SoC state and comparison of these recalculated hash values with previous hash values to verify the integrity of the SoC state stored in the external memory 120 while the SoC was in a STR state. This process of hash calculation and hash comparison may be codified as application code loaded into the CC-RAM 154 and executed by the processor core 150 as a functional module during an instance of the rebirth mode for the SCPU 130. Other examples of a functional module implemented with the SCPU 130 include functional modules directed to power management functions (e.g., clock management or peripheral control during low power states), security functions, memory scrubbing, TEE modification, security countermeasures, field programming or update of the OTP or the boot code, and the like.

With the DMA engine 156 reconfigured to be controllable by any RBM host, at block 506 the DMA engine 156 is placed in a ready state to await receipt of a DMA load descriptor from an authorized host. When a DMA load descriptor is received, at block 508 the state machine 126 initiates an instantiation of the rebirth mode by resetting the SCPU 130 so as to clear its current state and to reset the execution trace to an initial pointer or location. At block 510, the DMA engine 156 uses the DMA load descriptor to copy the application code from the location specified in the DMA load descriptor into the CC-RAM 154 and at block 512 the DMA engine 156 fills the remaining storage locations of the CC-RAM 154 with NOP values. After the copy of the application code and the NOP fill has completed, at block 514 the state machine 126 releases the SCPU 130 from reset.

When the SCPU 130 is out of reset from the SCPU rebirth mode, at block 516 the processor core 150 of the SCPU 130 begins to attempt to execute code starting with its pre-programmed initial location in its execution trace. As noted above, this initial location is the location in the CC-ROM 152 storing the first instruction of the initialization firmware. However, because the CC-ROM 152 is locked down (see method 400 of FIG. 4) during the SCPU rebirth mode and thus returns a NOP for each attempted access to the CC-ROM 152, the CPU execution trace will slide through all of the NOPs in the CC-ROM range and then step into the application code that was previously loaded into the CC-RAM 154 at block 510. At this point, the processor core 150 begins execution of the application code, which manipulates the processor core 150 and corresponding peripheral devices to implement the functional module represented by the application code.

Upon completion of execution of the application code, the flow of method 500 can return to block 506, whereupon the DMA engine 156 awaits the next DMA load descriptor, in response to which another instantiation of the rebirth mode can be performed. In some implementations, one or more DMA load descriptors may be issued while the SCPU 130 is occupied with one instance of the rebirth mode, and thus the SBC 102 may use a queue or other mechanism to buffer and prioritize DMA load descriptors for processing by the SCPU 130.

Figure 6:
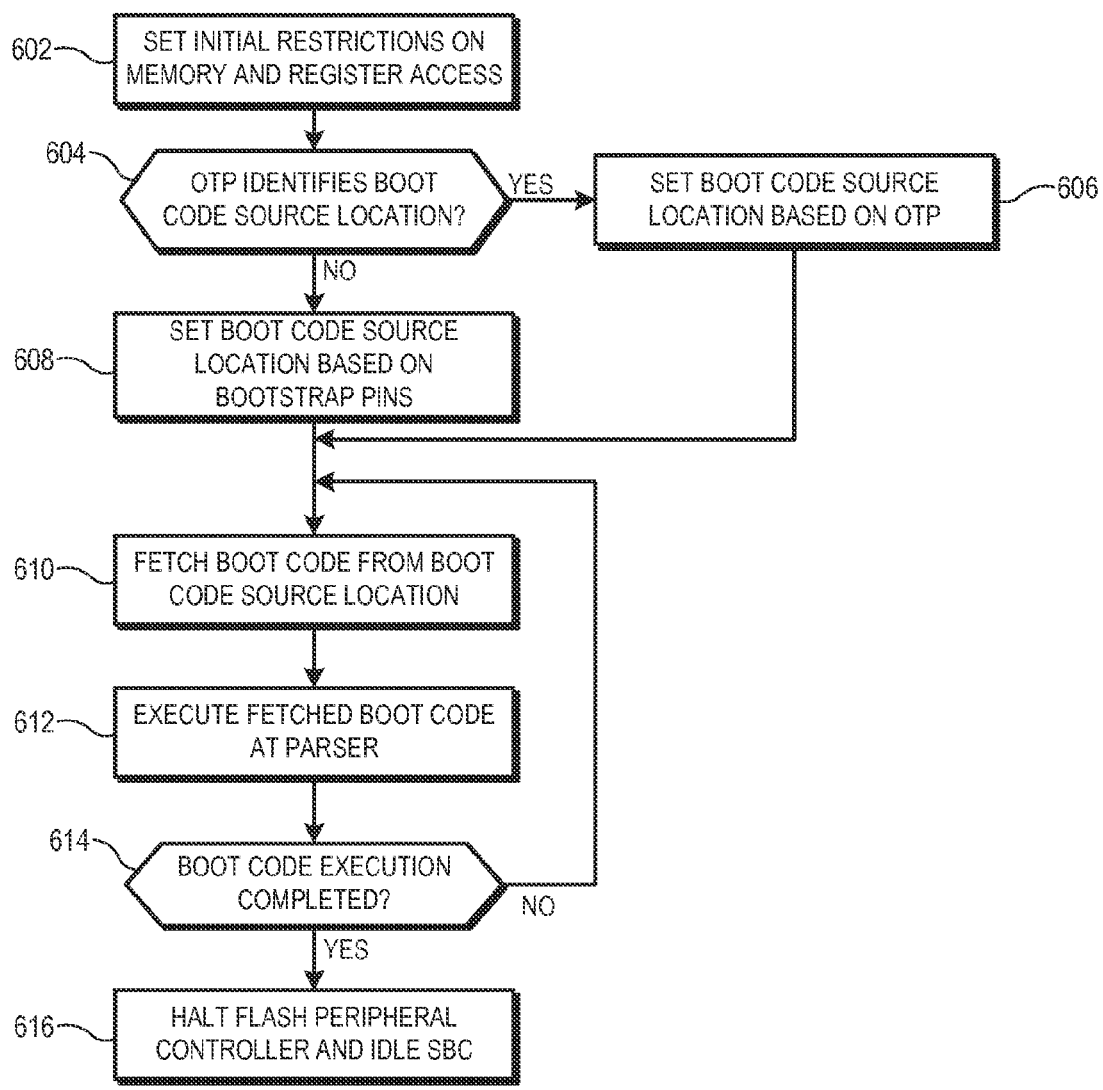
FIG. 6 is a block diagram illustrating a non-secure self-boot mode of the secure boot controller of FIG. 1 in accordance with at least one embodiment of the present disclosure.

In some implementations, it may be unnecessary to require the security features provided though the secure self-boot mode 208 as described above. In such instances, the SBC 102 may be configured via the bootstrap configuration stored in the OTP memory 104 or the bootstrap configuration represented by the bootstrap pins 162 to instead perform the non-secure self-boot mode 210 by executing non-secure boot code stored in a Flash memory (or other non-volatile memory) or other peripheral device external to the SoC 100. FIG. 6 illustrates an example method 600 of operation of the SoC 100 for the non-secure self-boot mode 210 in accordance with at least one embodiment. As similarly described above with reference to block 310 of the secure self-boot mode 208, the method 600 initiates at block 602 with the state machine 126 setting the initial restrictions on memory access and register access so as to prevent other components of the SoC 100 from interfering with the boot process.

The boot code used in the non-secure self-boot mode 210 may be obtained from any of a variety of external components, such as from a Flash memory connected to the SoC 100, a hard drive connected via a peripheral host 116, from a remote source accessed over a network via a network interface and a corresponding peripheral host, and the like. As either the OTP memory 104 or the bootstrap pins 162 may indicate the location of the non-secure boot code, in one embodiment the state machine 126 utilizes a priority order whereby the boot configuration information of the OTP memory 104 takes priority over the configuration represented by the bootstrap pins 162. Thus, at block 604 the state machine 126 determines whether the OTP memory 104 is storing boot configuration information that identifies a source location for the boot code to be loaded and executed in the non-secure self-boot mode 210. If the OTP memory 104 contains such information, at block 606 the state machine 126 sets the source location of the boot code as the source location identified by the OTP memory 104. If the OTP memory 104 does not contain such information, at block 608 the state machine 126 interprets the configuration of the bootstrap pins 162 to set the source location of the boot code to be loaded and executed.

At block 610 the state machine 126 controls the boot peripheral IF 132 to begin the process of transferring a copy of the boot code from the Flash memory identified as the source location via the corresponding Flash controller of the Flash module 106 if the source location is identified as Flash memory. If the source location is identified as a different peripheral device, the state machine 126 controls the memory controller 110 and/or the RBM 108 to initiate the transfer of a copy of the boot code from the corresponding peripheral device.

As boot code is fetched from the indicated source location, the fetched boot code is provided to the parser 128, which executes the provided boot code as it is received at block 612 so as to initialize and otherwise provision the components of the SoC 100. As represented by block 614, the state machine 126 monitors the progress of the process of fetching the boot code and its execution by the parser 128. When the transfer and execution of the boot code has completed, at block 616 the state machine 126 controls the boot peripheral interface 132 to halt the Flash controller and the SBC 102 enters an idle state. At this point, the SoC 100 is initialized and thus can begin multimedia processing operations and other post-boot application execution functions.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. An embedded system comprising:
an interface to an external peripheral device storing secure boot code; and
a secure boot controller comprising:
  a secure central processing unit (CPU) comprising:
    a processor core;
    a random access memory (RAM) coupled to the processor core; and
    a read only memory (ROM) coupled to the processor core, the ROM storing initialization firmware, the initialization firmware configured to manipulate the processor core to initiate transfer of a copy of the secure boot code from the external peripheral device to the RAM and to authenticate the secure boot code; and
  a direct memory access (DMA) engine coupled to the RAM, wherein the DMA engine is to:
    transfer the copy of the secure boot code to the RAM in a first mode during initialization of the embedded system; and
    transfer application code representing an independent functional module from a peripheral device to the RAM in a second mode subsequent to initialization of the embedded system; and
wherein the processor core is to execute the secure boot code from the RAM to initialize the embedded system.

2. The embedded system of claim 1, further comprising:
a one time programmable (OTP) memory coupled to the secure boot controller, the OTP memory storing provisioning information for initializing the embedded system; and
wherein the secure boot code is to manipulate the processor core to initialize the embedded system based on the provisioning information from the OTP memory.

3. The embedded system of claim 2, wherein the provisioning information further identifies the external peripheral device as storing the secure boot code.

4. The embedded system of claim 1, wherein the external peripheral device comprises a non-volatile memory.

5. The embedded system of claim 1, wherein the RAM and ROM are accessible only via the secure CPU.

6. The embedded system of claim 1, further comprising:
a cryptographic engine coupled to the secure boot controller;
wherein the secure boot code is transferred in encrypted form from the external peripheral device; and
the initialization firmware further is to manipulate the processor core to control the cryptographic engine to decrypt the secure boot code before storing the secure boot code to the RAM.

7. The embedded system of claim 1, wherein the secure boot controller is to lock the ROM from further access after the processor core has completed execution of the initialization.

8. The embedded system of claim 1, wherein:
in the second mode, the secure boot controller is to reset the processor core; and
the processor core is to execute the application code from the RAM in response to the reset.

9. The embedded system of claim 1, wherein the embedded system comprises a system on a chip (SoC).

10. A method for initializing an embedded system, the method comprising:
for a first boot phase, executing initialization firmware stored in a read only memory (ROM) at a processor core of a secure central processing unit (CPU), wherein executing the initialization firmware manipulates the processor core to:
initiate transfer of a copy of secure boot code from an external peripheral device to a random access memory (RAM) of the secure CPU via a direct memory access (DMA) engine of the secure CPU; and
authenticate the secure boot code; and
for a second boot phase, executing the secure boot code from the RAM at the processor core in response to authenticating the secure boot code, wherein executing the secure boot code manipulates the processor core to initialize the embedded system; and
transferring application code representing an independent functional module from a peripheral device to the RAM via the DMA engine subsequent to initialization of the embedded system.

11. The method of claim 10, wherein:
the embedded system includes a one time programmable (OTP) memory that stores provisioning information for initializing the embedded system; and
executing the secure boot code manipulates the processor core to initialize the embedded system based on the provisioning information from the OTP memory.

12. The method of claim 11, wherein:
the provisioning information further identifies the external peripheral device as storing the secure boot code; and
executing the initialization firmware manipulates the processor core to initiate transfer of a copy of the secure boot code from the external peripheral device based on the provisioning information from the OTP memory.

13. The method of claim 10, further comprising:
configuring the RAM and ROM to be accessibly only via the secure CPU, wherein the RAM and ROM are only accessible via the secure CPU.

14. The method of claim 10, wherein:
the secure boot code is stored in encrypted form at the external peripheral device; and
execution of the initialization firmware manipulates the processor core to control a cryptographic engine of the embedded system to decrypt the secure boot code before storing the secure boot code to the RAM.

15. The method of claim 10, further comprising:
locking the ROM from further access in response to the processor core completing execution of the initialization firmware in the first boot phase.

16. The method of claim 10, further comprising:
resetting the secure CPU subsequent to initialization of the embedded system; and
executing the application code at the processor core from the RAM in response to resetting the secure CPU.

17. In an embedded system, a method comprising:
in response to a one time programmable (OTP) memory storing provisioning information having a first configuration, accessing non-secure boot code from an external peripheral device and executing the non-secure boot code at a boot controller to initialize the embedded system; and
in response to the OTP memory storing provisioning information having a second configuration:
executing initialization firmware stored at a read only memory (ROM) of the boot controller to initiate transfer of a copy of secure boot code from an external peripheral device to a random access memory (RAM) of the boot controller and to authenticate the secure boot code;
in response to authenticating the secure boot code, executing the secure boot code from the RAM to initialize the embedded system based on the provisioning information stored in the OTP memory;
after completing initialization of the embedded system, storing application code representing an independent software function to the RAM; and
executing the application code from the RAM to perform the independent software function.

* * * * *